(12) United States Patent
Watkins

(10) Patent No.: US 6,609,173 B1
(45) Date of Patent: Aug. 19, 2003

(54) COMPACT DISC EMULATION IN A FLASH

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 88 days.

(21) Appl. No.: 09/721,319

(22) Filed: Nov. 22, 2000

(51) Int. Cl.[7] .......................... G06F 12/06; G06F 13/16
(52) U.S. Cl. .......................... 711/103; 711/104; 710/68
(58) Field of Search .......................... 703/24; 707/101; 710/68; 711/102, 103, 104, 105, 171, 202

(56) References Cited

U.S. PATENT DOCUMENTS

| | | | | |
|---|---|---|---|---|
| 5,581,740 A | * | 12/1996 | Jones .......................... | 703/25 |
| 5,623,623 A | * | 4/1997 | Kim et al. .................. | 711/103 |
| 5,828,862 A | * | 10/1998 | Singkornrat et al. ........ | 711/115 |
| 6,145,069 A | * | 11/2000 | Dye .......................... | 711/170 |
| 6,195,107 B1 | * | 2/2001 | Iverson ...................... | 345/516 |
| 6,237,080 B1 | * | 5/2001 | Makinen ...................... | 712/41 |
| 6,266,736 B1 | * | 7/2001 | Atkinson et al. ........... | 711/103 |

* cited by examiner

Primary Examiner—Gary Portka
(74) Attorney, Agent, or Firm—Christopher P. Maiorana, PC

(57) ABSTRACT

A method for storing data in a solid state device, comprising the steps of (A) retrieving data from a source device, (B) storing said data in a compressed format to said solid state device and (C) accessing and uncompressing portions of said data from said solid state device, wherein said portions represent data to be executed in response to an address.

20 Claims, 9 Drawing Sheets

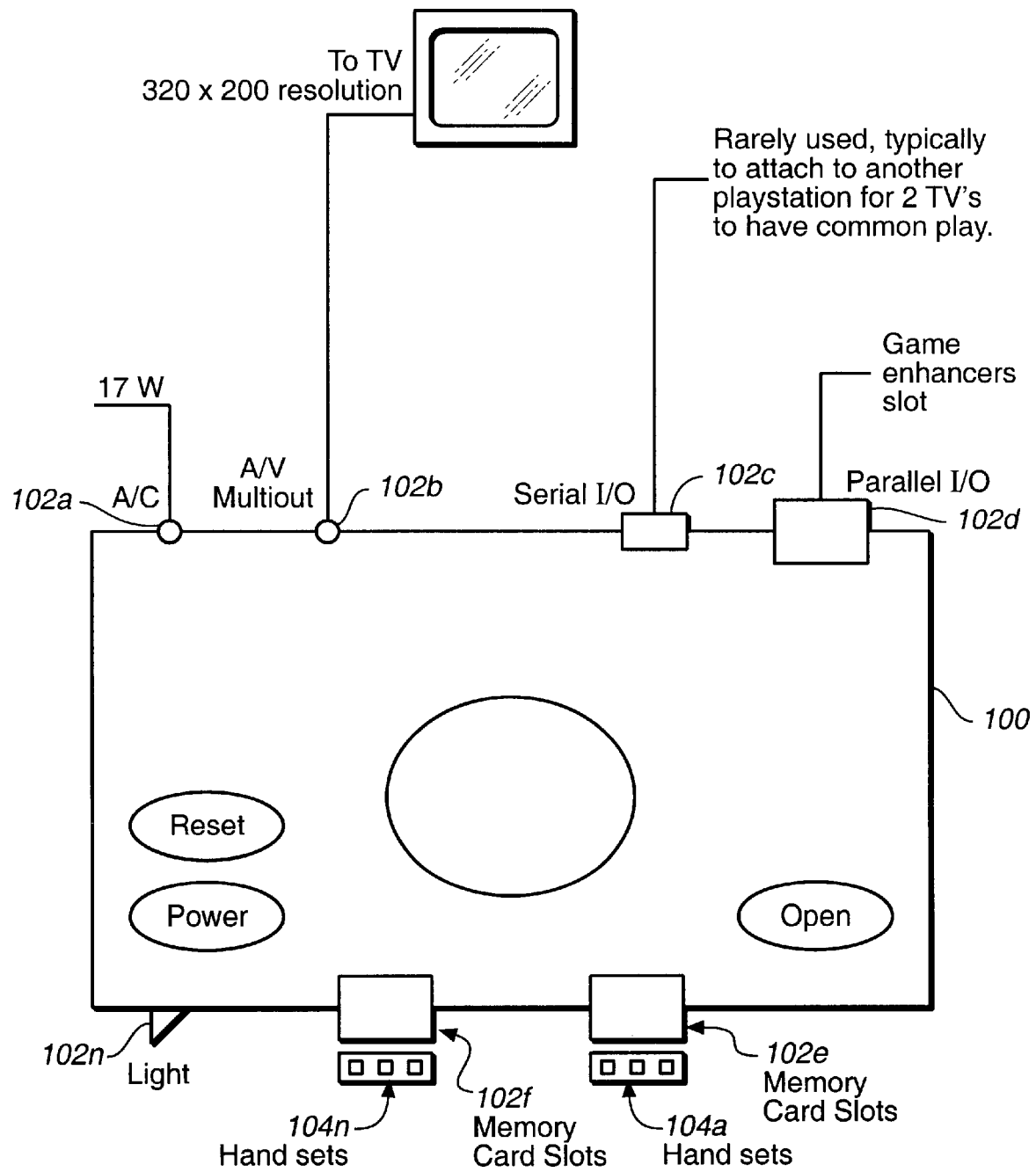
FIG._1

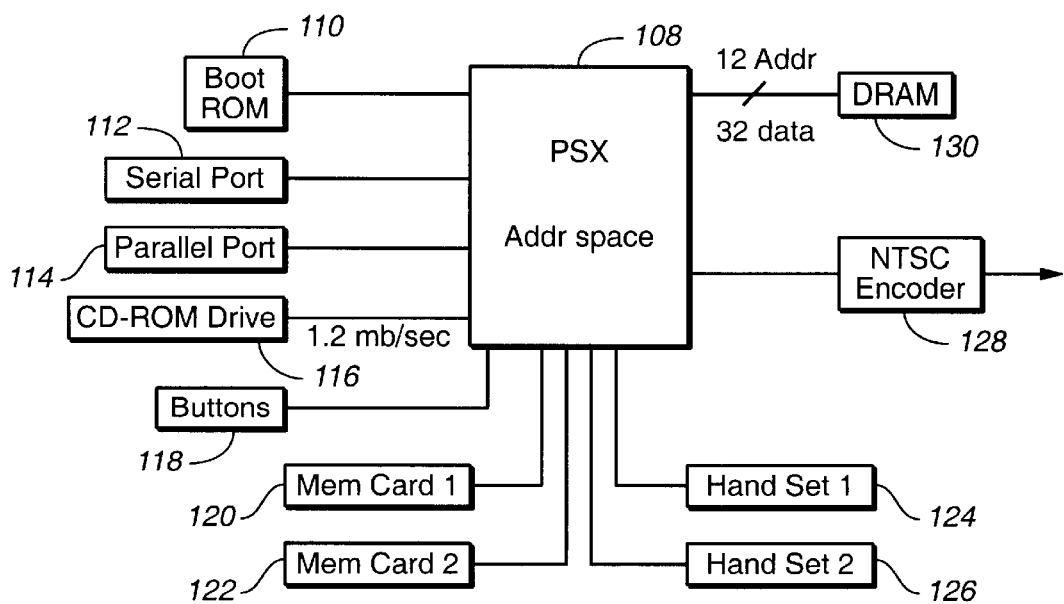
FIG._2
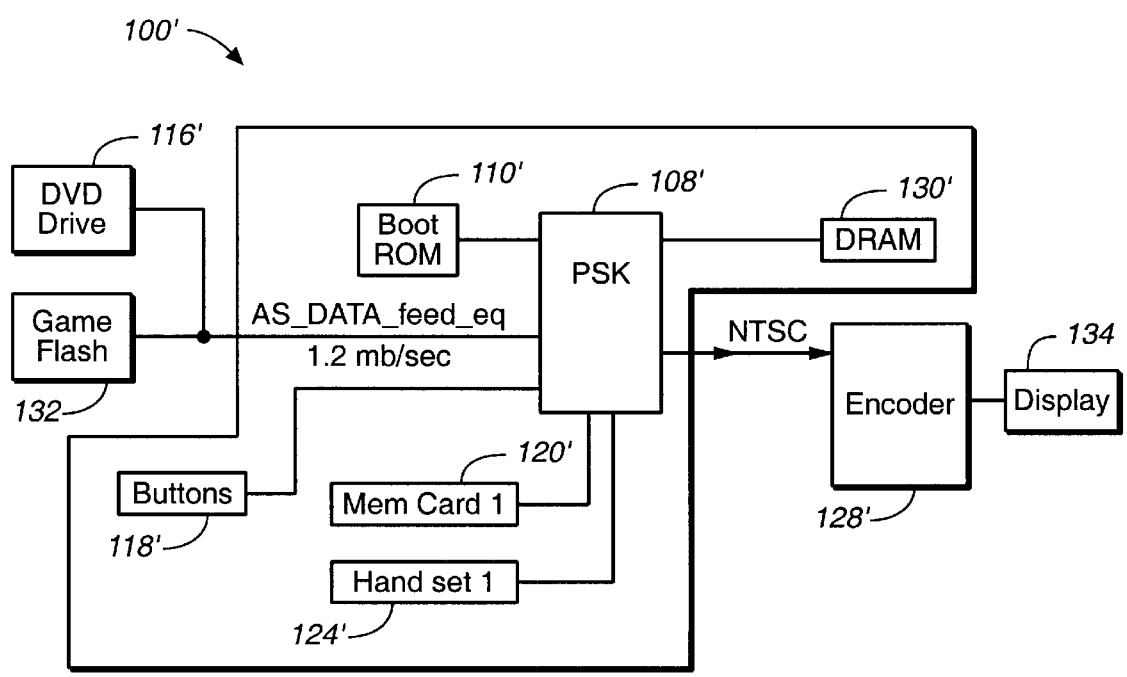
FIG._3

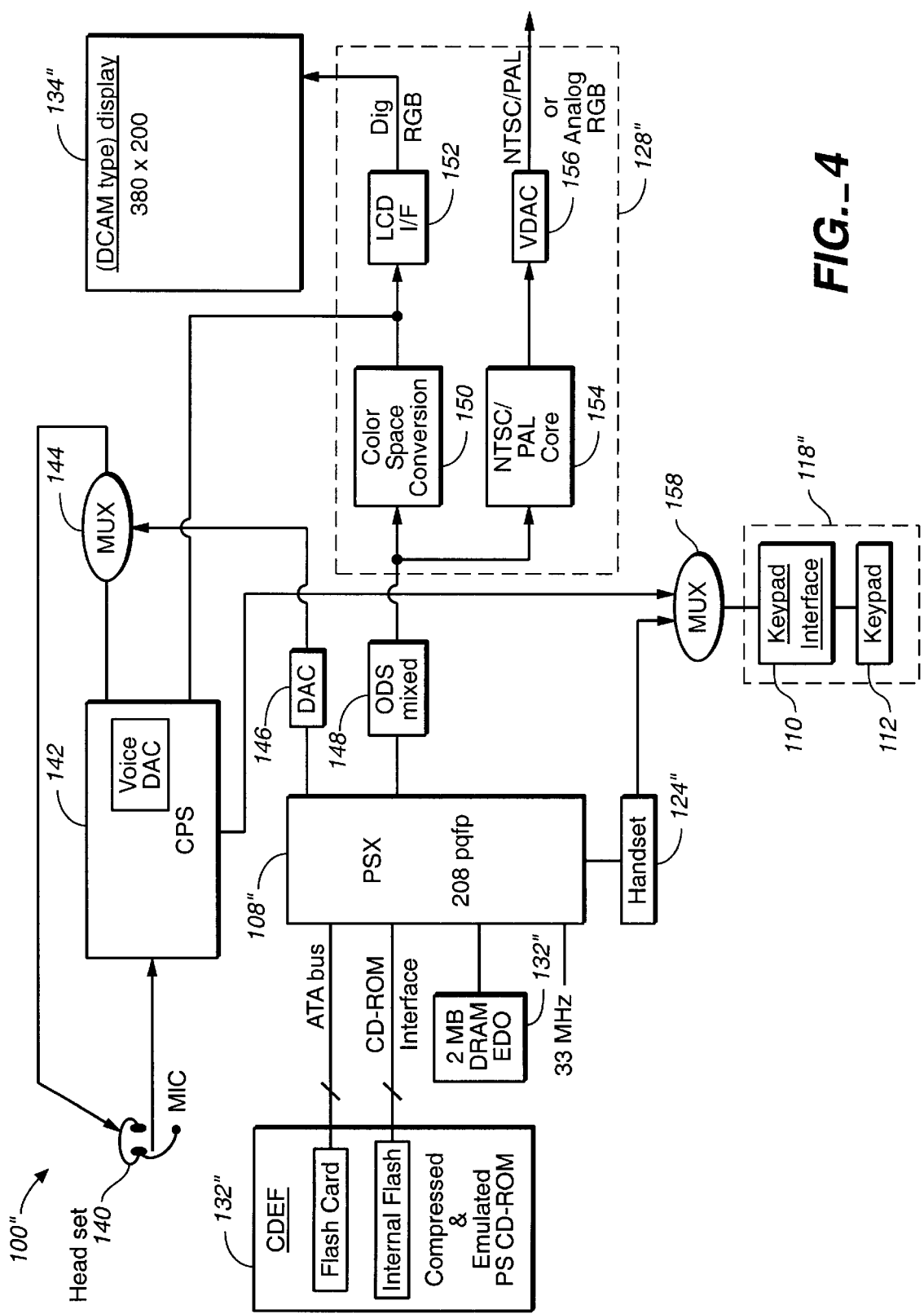
FIG._4

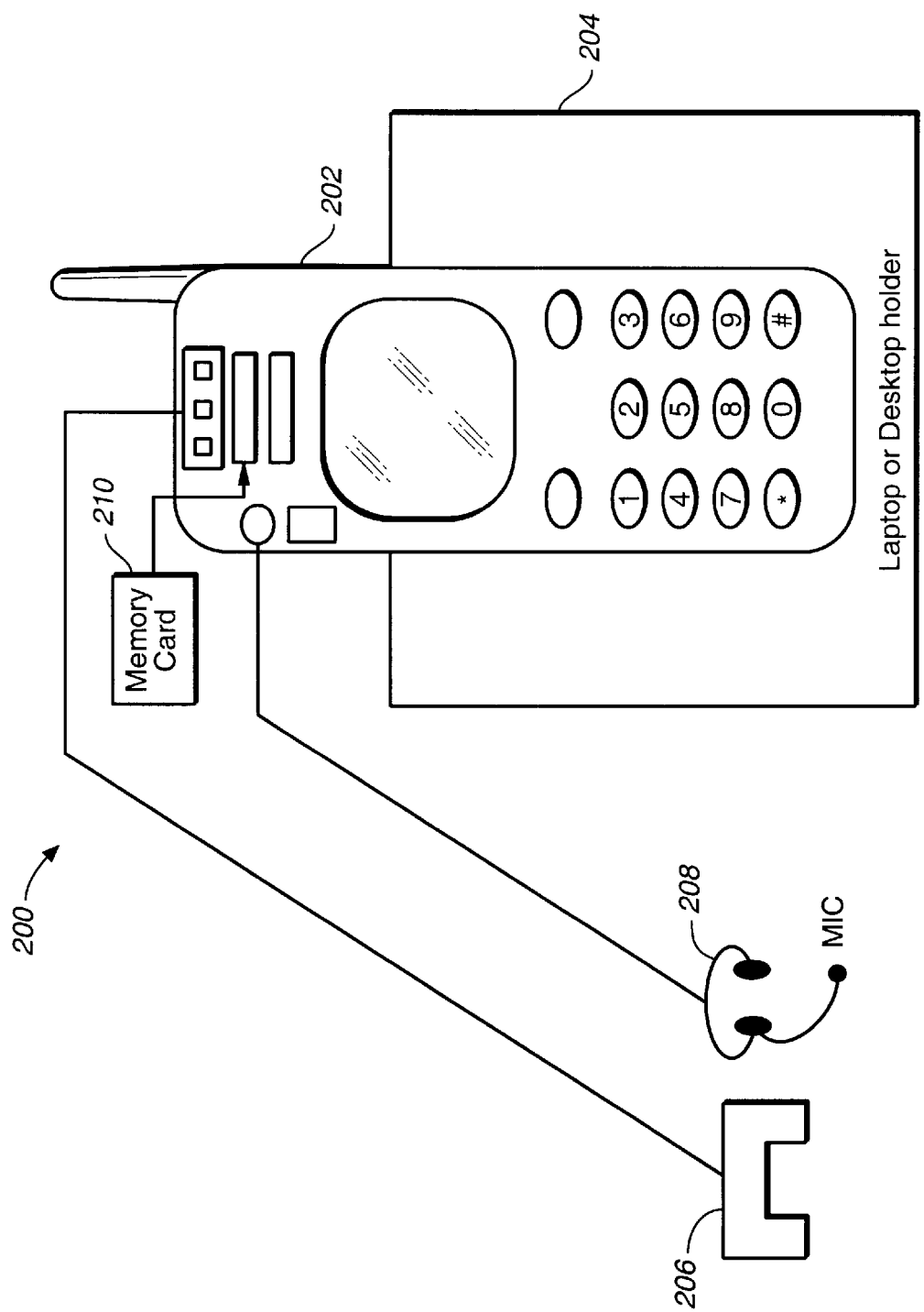
FIG._5

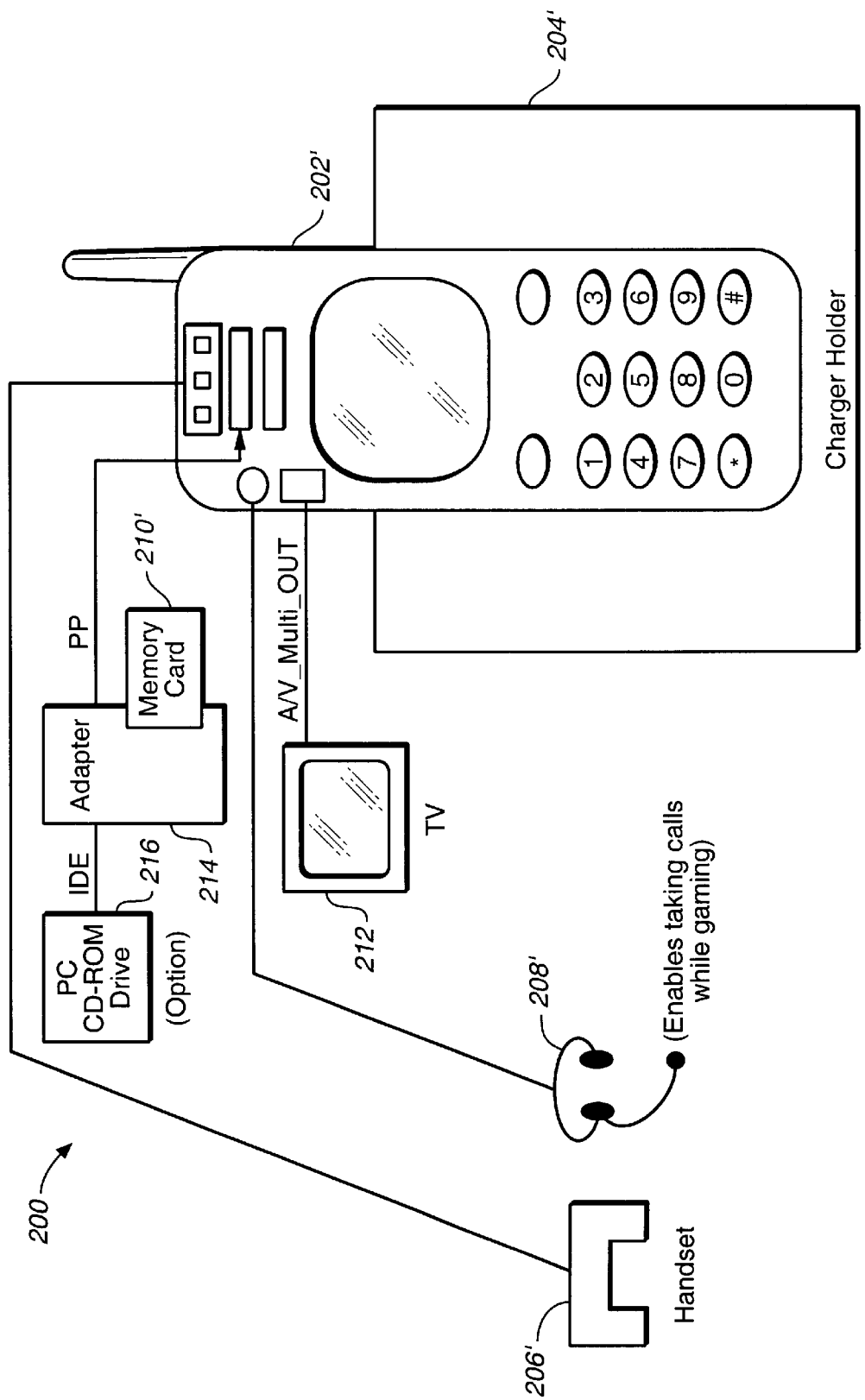
FIG._6

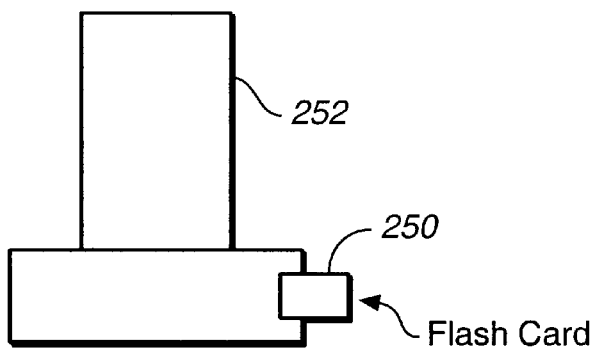
FIG._7a
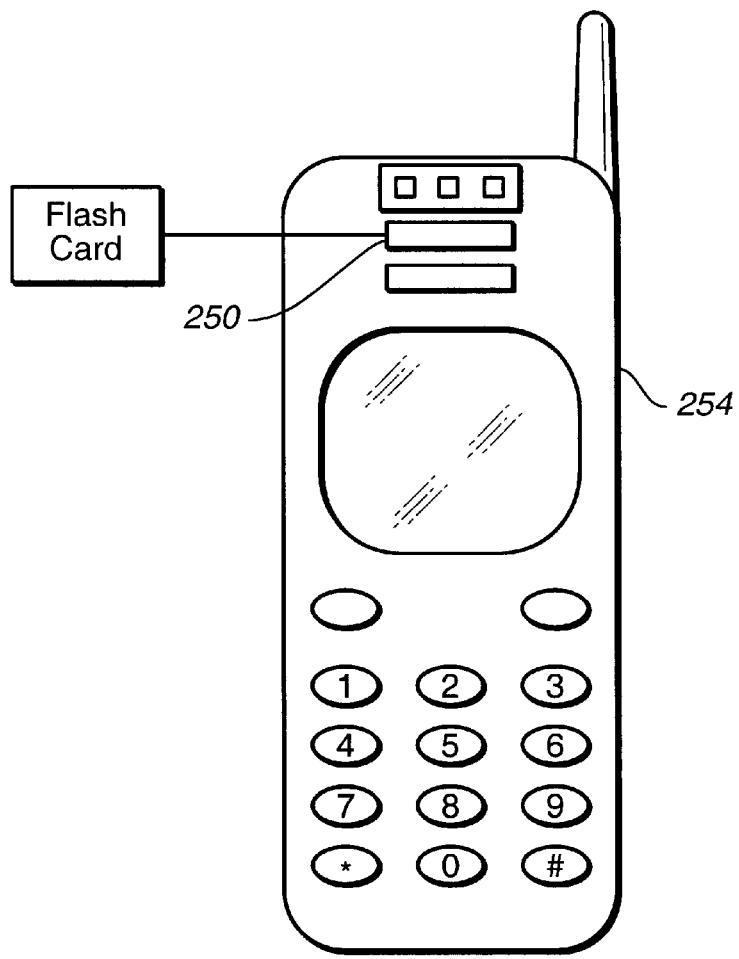
FIG._7b

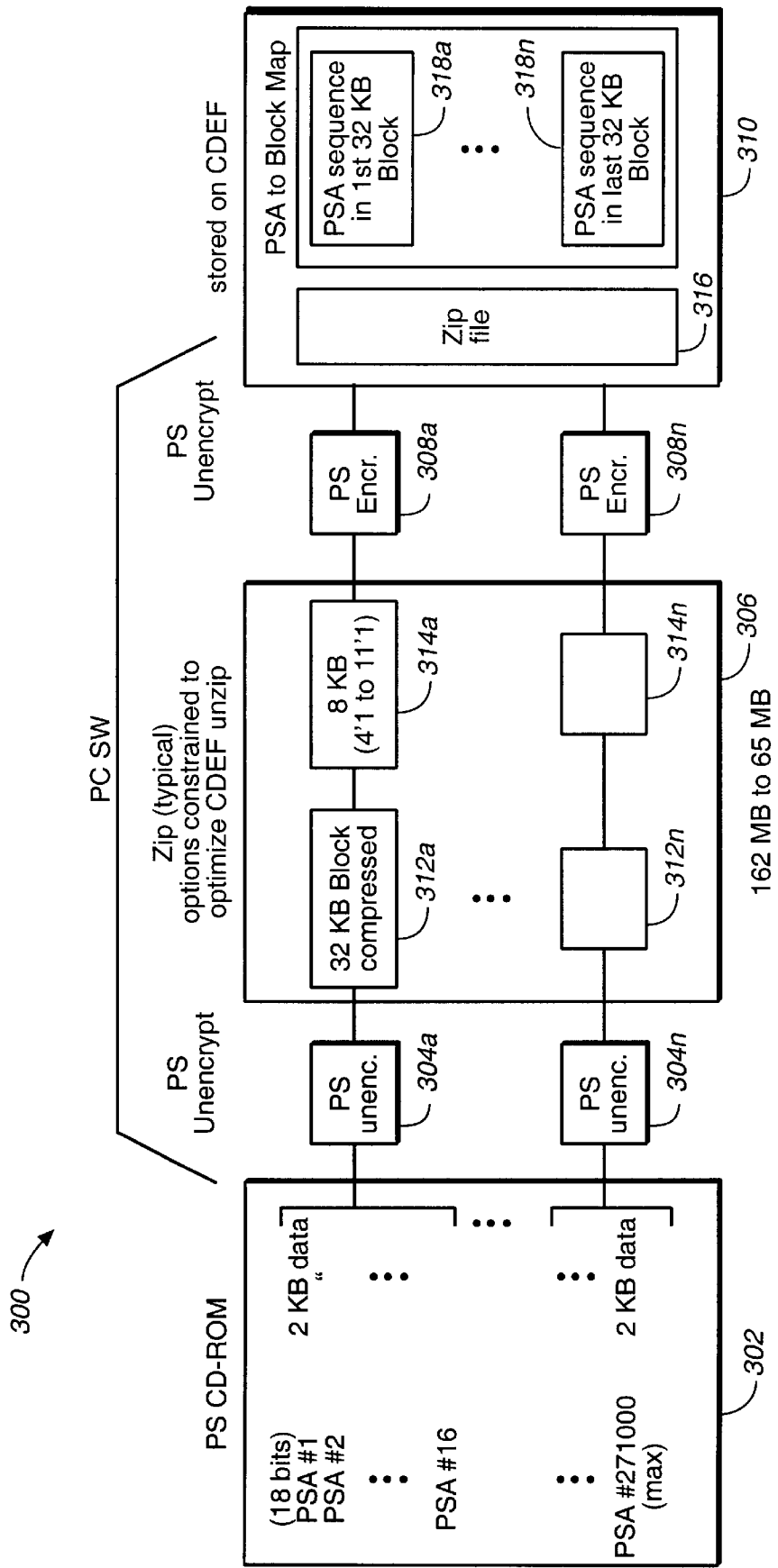
FIG._8

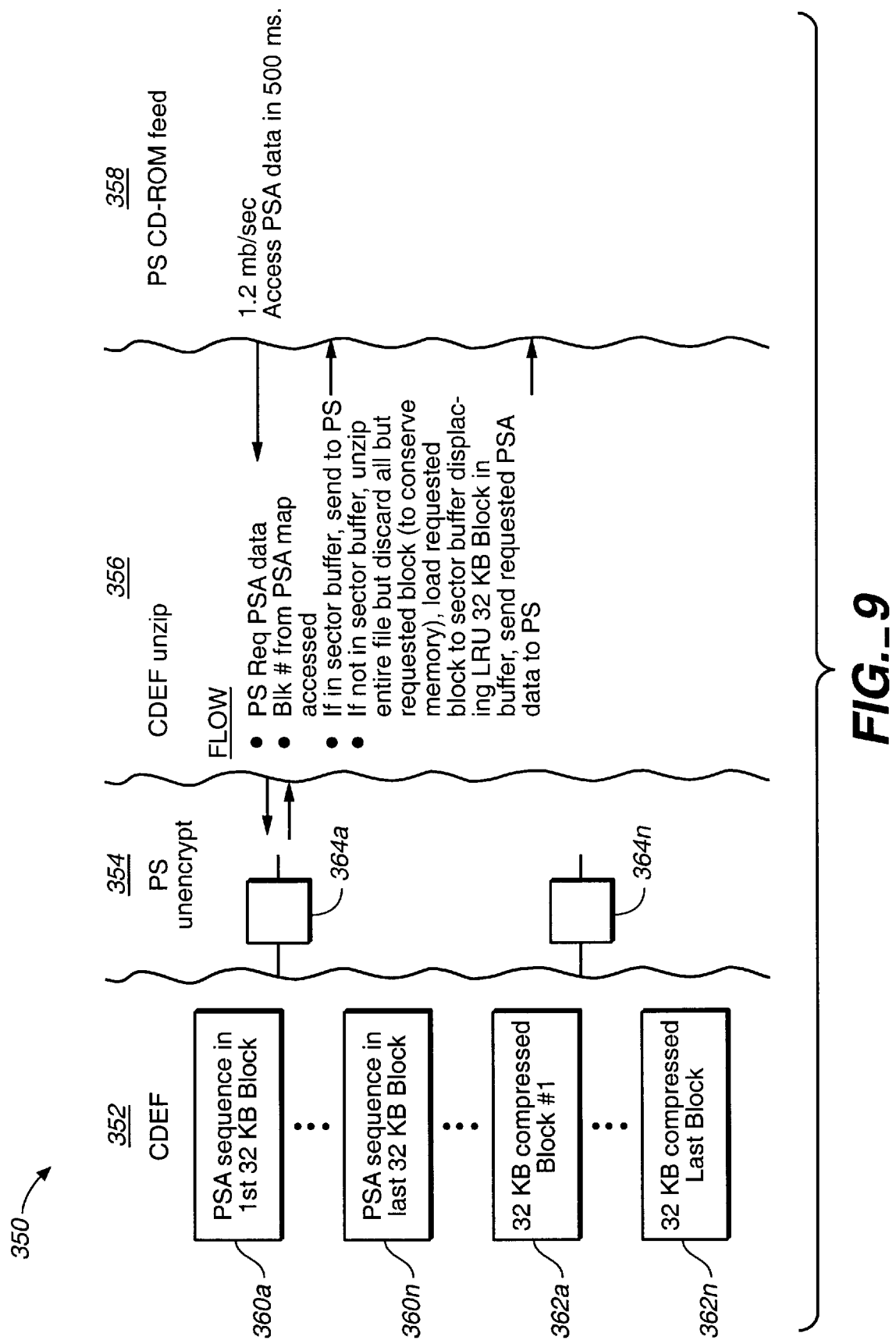
FIG._9

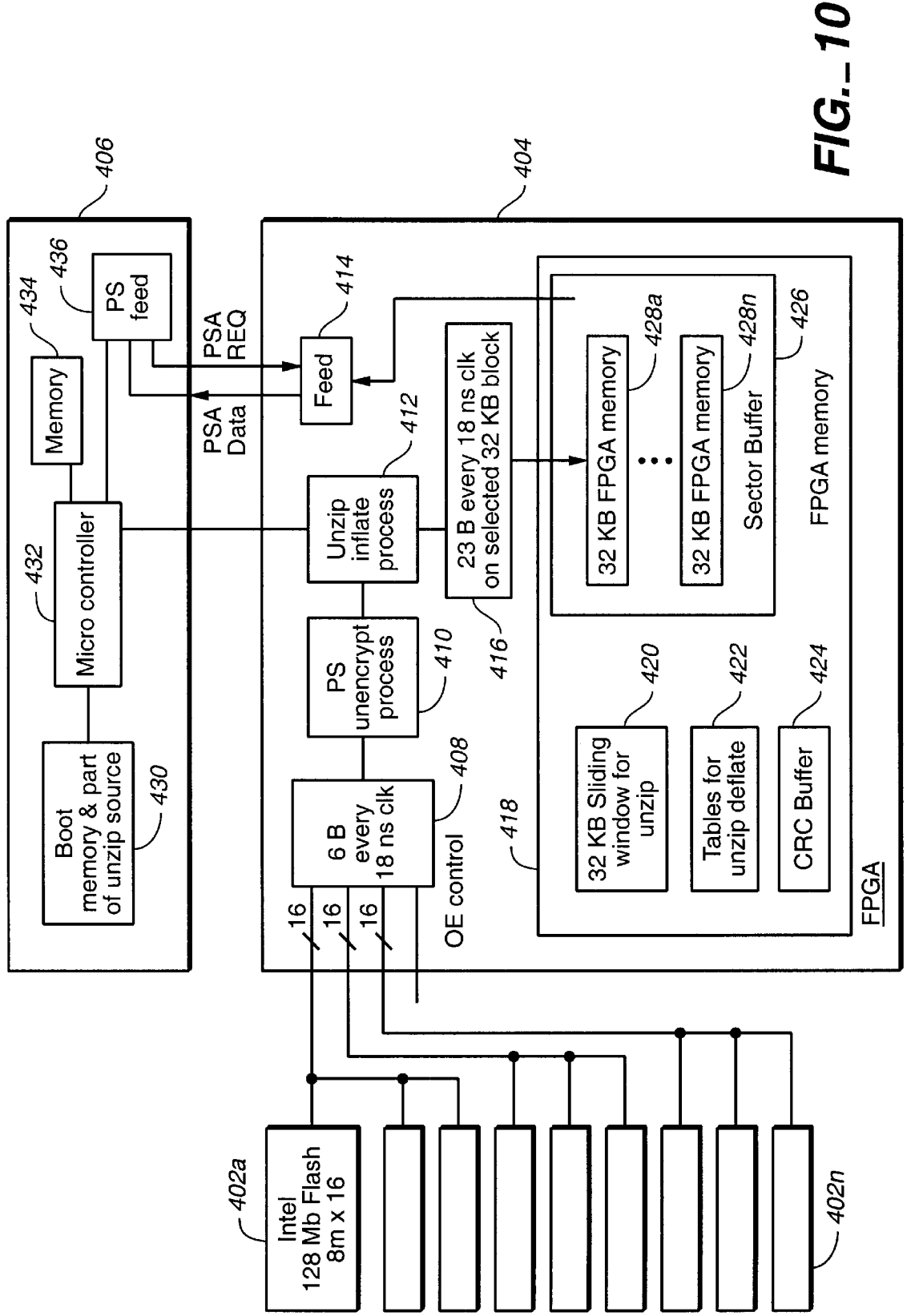
FIG._10

COMPACT DISC EMULATION IN A FLASH

FIELD OF THE INVENTION

The present invention relates to a method and/or architecture for implementing compact disc (CD) emulation generally and, more particularly, to a method and/or architecture for implementing CD emulation in a solid-state flash memory.

BACKGROUND OF THE INVENTION

Mobile devices which have sizable memory capacity are costly and not effectively implemented. Flash cards provide dependent solid-state storage for data in a mobile device. However, conventional CD emulators require multiple flash memory cards to represent CD-ROM data. For example, a conventional CD-ROM disk can hold up to 650 MB, so five 128 MB flash cards would need to be used to store the contents of an entire CD-ROM disk. If each flash card costs in the range of $350, such an implementation is quite expensive.

Portable CD-ROM drives are another way to provide CD-ROM data for a mobile device. However, implementation of portable CD-ROM drives is limited, since the drive cannot be jarred or tipped improperly.

Cellular phones also store data in a mobile (solid state) format. However, cellular phones have limited data capacity. Additionally, cellular phones have a limited display, audio and processing capability. Furthermore, web access with cellular, phones is currently more expensive than other types of online access.

It is desirable to enable a, mobile device, such as a cellular phone or PDA, with silicon to implement a better display to allow an equivalent experience as a traditional gaming device, without requiring continuous web access. It is also desirable to enable a small solid state media, such as a single 128 MB flashcard, to have a data storage equivalent of a CD-ROM disk.

SUMMARY OF THE INVENTION

The present invention concerns a method for storing data in a solid state device, comprising the steps of (A) retrieving data from a source device, (B) storing the data in a compressed format to the solid state device and (C) accessing and uncompressing portions of the data from the solid state device the portions generally representing data to be executed, in response to an address.

The objects, features and advantages of the present invention include a method and/or architecture for implementing CD emulation in a solid state device, flash memory, that may (i) allow lossless compression of CD-ROM data, in particular playstation CD-ROM data, (ii) allow physical sector address (PSA) mapping to be maintained throughout the compression process and implemented by the CD-ROM feed receiving hardware, and software, (iii) maintain CD-ROM security, (iv) provide additional levels of security beyond traditional CD-ROM security, (v) allow windowing into a compressed file, (vi) provide cache sectors for fast access, (vii) have a balanced cache size, (viii) have reduced power consumption, (ix) allow variable and dynamic partitioning of system resources, (x) have flexible partitioning based on system needs, (xi) be implemented without external data storage if adequate local memory is available, (xii) allow existing systems to be upgraded to support compact disc emulation in a flashcard feed device, (xiii) allow in-coming phone calls to be answered, (xiv) allow portable devices (cellular phones/PDAs) to communicate with traditional TV sets, (xv) implement portable devices (cellular phones) with power conservation features, and/or (xv) allow portable devices to display text.

BRIEF DESCRIPTION OF THE DRAWINGS

These and other objects, features and advantages of the present invention will be apparent from the following detailed description and the appended claims and drawings in which:

FIG. 1 is a block diagram of a game console;

FIG. 2 is a block diagram of an example of a silicon implementation of a game console;

FIG. 3 is a block diagram of an example of a silicon implementation of a game console;

FIG. 4 is a detailed block diagram of an embodiment of the present invention;

FIG. 5 is a block diagram of an example implementation of the present invention;

FIG. 6 is a block diagram of an example implementation of the present invention;

FIGS. 7 (a–b) are block diagram s illustrating basic operations of the present invention;

FIG. 8 is a block diagram implementation of the present invention;

FIG. 9 is a block diagram illustrating a data flow of the present invention; and FIG. 10 is a block of another embodiment of the present invention.

DETAILED DESCRIPTION OF THE PREFERRED EMBODIMENTS

The present invention may provide a CD emulation in flash (CDEF) system that may cache sectors of data based on CD-ROM feed requirements. The present invention may compress CD-ROM data onto a flash memory card, such that the original CD-ROM data is available, in a similar format with typical access methods and/or rates to a CD-ROM drive. The present invention may comply with a variety of compression formats. In one example, the present invention may comply with zip compression. Additionally, the present invention may not require an entire zip file to be fully decompressed (e.g., unzipped) and stored to access a particular portion of the data. The present invention may sustain and optionally enhance security of CD-ROM data. In one implementation, the present invention may allow a wireless phone gaming system by implementing CDEF. In particular the present invention may provide a portable hand-held gaming system that allows add on flash cards to implement CDEF. Alternately, the present invention may provide a stand-alone hand-held gaming system implementing the CDEF concepts. The present invention may also allow wireless download of games using CDEF to different mobile memory, such as SDRAM.

Referring to FIG. 1, a block diagram of a system 100 is shown implementing a game console. In one example, the system 100 may be implemented as a Sony Playstation (PS) gaming console. The system 100 may allow improved mobile use of CD-ROM data. The system 100 may provide lossless compression of CD-ROM data on to a flash memory card (or device).

The system 100 generally comprises a number of inputs or outputs 102a–102n, where n is an integer. The various input/outputs 102a–102n may present or receive a number of signals to and/or from external devices. For example, the input 102a may receive a power supply from an external device. The output 102b may present an output signal to a display device, such as a 320×200 resolution television set. The input/output 102c may attach to another device, such as another playstation, to allow a multiple number of displays to display a common game. The input/output 102d may be a parallel input/output that may accommodate additional game enhancements. The inputs/outputs 102e and 102f may be implemented as memory card slots. Additionally, the system 100 may have a number of handsets 104a–104n to interact with end users. The output 102n may provide a visual indication, such as a light, indicating certain functional operations of the PS 100.

FIG. 2 shows a silicon implementation of the playstation 100. The system 100 is shown comprising a playstation address space 108, a boot ROM 110, a serial port 112, a parallel port 114, a CD-ROM drive 116, an array of buttons 118, a memory card 120, a memory card 122, a handset 124, a handset 126, an NTSC define encoder 128, a DRAM 130.

FIG. 3 shows a generic silicon implementation 100' of the playstation 100. The generic playstation silicon 100' is similar to the silicon implementation of the playstation 100. The generic playstation silicon 100' may additionally implement a game flash 132 and a display 134. The generic playstation silicon illustrates how the playstation functionality can be embedded in other appropriate type devices (e.g., cellular phones, PDAs, wrist-watches, stand-alone gaming devices, and other applicable mobile devices). The generic playstation silicon 100' may implement the flash memory 132, as part of the preferred embodiment of the present invention. The flash memory 132 may be implemented as a solid state memory device. The solid state flash memory 132 may be configured to present data to the playstation address space 108' at a rate of 1.2 MB/sec. The flash memory 132 may provide CDEF as described in connection with the present invention.

FIG. 4 is the block diagram of a portable wireless playstation silicon 100". In one example, the portable wireless playstation silicon 100" may be implemented with a CDMA single chip cellular phone. The CDEF 132" can be manifested in a flash card (ATA interface) or an internal flash (CD-ROM interface). The portable wireless playstation silicon 100" may have a number of additional features which may allow full portability of conventional CD-ROM games. The portable wireless playstation silicon 100" may additionally comprise a head set 140, a cellular phone system (CPS) 142, a multiplexer 144, a digital analog conversion (DAC) circuit 146, an on-screen display (OSD) mixer 148, a color space conversion circuit 150, an LCD interface 152, an NTSC/PAL core 154, a video digital analog conversion (VDAC) circuit 156, a multiplexer 158, a keypad interface 160 and a keypad 162.

An audio out of the cellular phone is generally multiplexed (via the multiplexer 144) with an audio out of the playstation 100" to the headset 140. A microphone input of the head set 140 may be implemented for microphone (e.g., voice) input only. Conventional cellular phone display technology may be required to be upgraded to support the resolution of the playstation data. The on-screen display mixer 148, the color space conversion 150, the LCD interface 152, the NTSC/PAL encoder 154, the VDAC circuit 156, and the display 134" may be implemented to provide an improved display. The handset keypad 162 may be used to setup playstation operation. Additionally, the playstation handset 124" is generally supported.

FIG. 5 illustrates a mobile gaming system 200. The system 200 generally allows gaming a PS cellular phone in a mobile setting (e.g., games may be played on the cellular phone screen). The mobile gaming system 200 generally comprises a cellular phone 202, a holder 204, a handset 206, a microphone 208 and a memory card 210.

FIG. 6 illustrates a mobile gaming system 200". The system 200' may be similar to the system 200. The PS cellular phone 202' may be connected to a TV 212 and optionally connected to a PC DVD drive 216 (via an adapter module 214). The PS cellular phone 202' is essentially used as a traditional PS would be used. So, not only can a PS be used on a cellular phone 202' (via the cellular phone screen and keypad), but also used in the traditional sense (via the TV display and gaming-controller). The cellular phone 202' enables mobile PS game play and/or TV based game play. The PS cellular phone 202' may implement existing PS connectors and silicon, existing CDMA system and silicon, existing DCAM display control design and display, and/or existing memory cards used for gaming progress. Other features of the cellular phone 202 include power conservation, independent cellular phone operation from PS operation and simultaneous operation support.

FIGS. 7a and 7b illustrate the basic operation of the present invention. FIGS. 7a and 7b illustrate a flash card 250 implemented in a PS cellular phone application. Referring to FIG. 7a, to load the CDEF card 250 with the PS game data the user desires, a PC 252 is used with specialized hardware/software that may unencrypt the original PS CD-ROM data, compress the game data including PSAs, encrypt the compressed files and load the data to the flash card 250. The compression options of the flash card 250 may allow mobile PS access to the game data of the flash card 250. to be <500 ms. The existing flash card slot on the PS is used to load the flash card based game info to the PS cell phone. Additionally, the PC 252 may be configured to accept a game feed from the flash card, internal flash memory or other appropriate type memory.

Referring to FIG. 7b, a cellular phone 254 is shown with the flash card 250 in connection with the present invention. Decompression hardware and software can be on the flash card 250 or part of an internal cellular phone upgrade. Optionally, the cellular phone 254 may be implemented with a flash card extender card for the PC, where the PS cellular phone 254 may be connected (via a cable) directly to the PC flash card slot and download data directly to the cellular phone internal flash memory (not shown). The cellular phone 254 may not require the flash card 250 if adequate local memory is available.

Referring to FIG. 8, an operation (or method) 300 of the present invention is shown. The operation 300 may illustrate how the CDEF PC software functions with the PC CD-ROM and flash card to use the zip utility within the PC. The operation 300 generally comprises a PS CD-ROM 302, a number of PS unencryption blocks 304a–304n, a compression block 306, a number of PS encryption blocks 308a–308n and a CDEF block 310. In one example, the PS unencryptions blocks 304a–304n, the compression block 306 and the PS encryption blocks 308a–308n may be implemented as software running on a PC. The compression block 306 generally comprises a number of compressed data blocks 312a–312n and a number of compression blocks 314a–314n. Additionally, the CDEF block 310 may comprise a compressed file block 316 and a number of address mapping blocks 318a–318n. The address mapping blocks 318a–318n may allow the PS 100 to quickly access the PS data stored and compressed within the compressed file block 316.

The PS CD-ROM 302 may read the PSAs and associated 2 KB data blocks. The CD-ROM 302 may then present the data to the PS unencryption blocks 304a–304n. The PS unencryption blocks 304a–304n may decrypt the PS data and present the compressed data block to the compression block 306. The compression block 06 may optimize and further compress the 32 KB compressed data blocks to 8 KB blocks. The compression block 306 may optimize the zip compression for CDEF unzip. The 8KB optimized and compressed data blocks 314a–314n may be presented to the PS encryption blocks 308a–308n. The PS encryption blocks 308a–308n may encrypt the optimized and compressed 8 KB data blocks 314a–314n. The data blocks may then be presented to the CDEF 310.

The encrypted optimized and compressed data blocks may be formed into a single compressed data file 316. In one example, the data blocks may be combined as a zip file. PSA mapping of the data blocks may be retained by the system 300. The mapping of the PSAs may be maintained and stored within a number of mapping blocks 318a–318n. The system 300 may allow PS data to be optimized and compressed to a flash card, that may provide a CD-ROM type interface (via the mapping blocks 318a–318n).

Referring to FIG. 9, an operation 350 of the present invention is shown. The operation 350 may illustrate how CDEF data is unzipped and feed to the PS silicon within the PS cell phone. The operation 350 generally comprises a CDEF section 352, a PS unencrypt section 354, a CDEF unzip section 356 and a PS CD-ROM feed section 358. The CDEF section 352 generally comprises a number of PSA blocks 360a–360n and a number of compressed data blocks 362a–362n. The PS unencrypt section 354 generally comprises a number of unencrypt blocks 364a–364n. The CDEF unzip section 356 may illustrate a flow of the unzip operation. For example, the PS may request a PSA data block. A particular block number (e.g., one of the compressed data blocks) from the PSA map is accessed. If the data block is in a sector buffer (not shown) the data block may be sent to the PS. If the data block is not in the sector buffer the operation 350 may unzip the entire compressed data file, discarding all but the requested data block, load the requested data block into the sector buffer and send the requested PSA data to the PS. The PS CD-ROM feed section 358 may then receive the data block at a rate of 1.2 MB/sec in less than 500 ms.

FIG. 10 is a block diagram of a CDEF unzip system 400 within a cellular phone, where an FPGA is used to accelerate the unzip and a microcontroller is used to control the process. The system 400 generally comprises a number of flash cards 402a–402n, an FPGA 404 and a control block 406. The FPGA 404 generally comprises an input block 408, a PS unencrypt process block 410, an unzip inflate process block 412, a feed block 414, a block 416, and a FPGA memory block 418. The FPGA memory block 418 generally comprises a sliding window block 420, a table block 422, a CRC buffer 424 and a sector buffer 426. The sector buffer 426 generally comprising a number of memory sections 428a–428n.

The control section 406 generally comprises a boot memory 430, a microncontroller 432, a memory 434 and a PS feed 436. The microncontroller 432 may be implemented to control the process of the FPGA 404. The system 400 may be implemented to provide PS data from the CDEF memory card.

A 'C to RTL' tool may be used to map C unzip routines to RTL. The RTL may then be synthesized to gates for programming the FPGA 404 (e.g., the unzip inflate process). Since the PS requests a PSA sector of data, (provided with CDEF unzip in the access time required) the CDEF system appears as a CD-ROM feed to the PS.

A typical CD-ROM disk holds 650 MB of data. The data is stored in 2 KB sectors, each with a physical sector address (PSA). A conventional PS may send a PSA, to the CD-ROM drive (not shown, within the PS) playing the CD-ROM, to read the appropriate 2 KB sector. The CDEF of the present invention may allow similar operation implementing a solid-state flash memory. The system 100 may also be implemented to preserve the PSA within a flash card memory to access the 2 KB sector structure.

The hardware acceleration needs to unencrypt and decompress a 32 KB block in 25 usec. Additionally, a 1x drive may be defined as 150 KB/sec transfer and 500 ms seek times. The time from when the PS requests a 2 KB sector of data to receiving the data needs to be <500 ms, while the 2 KB sector transfer rate needs to be 150 KB/sec. The transfer rate may be easily obtained, as 150 KB/sec can be sustained with a 54 MHz clock.

However, the entire unzip seek time needs to be <500 ms. The unzip process generally occurs in 32 KB blocks and 650 MB disk contains 20, 32 KB blocks of data. So, in 25 usec, a 32 KB block process needs to be complete, requiring a 23 B/54 MHz (e.g., 18 ns) clock. At a 4–1 compression, 6 B needs to be presented to the FPGA 404 every 54 MHz clock and 23 B out per clock. However, 23 B every 18 ns on a selected 32 KB will be loaded to the FPGA sector buffer 426. The microcontroller 432 may control the setup of such a process.

The hardware/software of the playstation 100 may be upgraded if needed. Additionally, the headsets and handsets of the present invention may be supplemented as wireless devices. Furthermore, the present invention may allow download access from another machine using wireless communication.

Part of the invention can be implemented, based on available memory and power conservation requirements. For example, dynamic caching of the decompressed unzip, files for a given PS title may be implemented. The system 100 may allow for increased accesses to the 32 KB sectors, requiring the entire data file to be unzipped. However, if a higher power consumption is required to sustain the uncompressed sectors in a large local cache for a given system, the local cache may be chosen dynamically with power consumption handler software. If the larger local cache is not needed, the local memory (such as SDRAM), can be powered down.

The, present invention may allow zip compression to be implemented for lossless compression of PS CD-ROM data such that a flash card memory can hold game data and be used for PS playback. Zip compression tools may be implemented with the unzip accelerated in hardware to meet the emulated CD-ROM drive feed requirements. Updates to the unzip software may not occur often, as the software is mature. However, if there is a desired upgrade, the upgrade may be implemented quickly with the architecture of the present invention. The unzip build script can partition what is passed to the FPGA hardware 404 and what is compiled to run on the CPU of the PS. The zip script that runs on the PC may have to go through an unzip process to determine if the CDEF unzip will meet the access requirements, (e.g., seek time and data transfer rates). If the unzip process does not meet the requirements, the FPGA 404 may analyze and implement the trade off between increased compression and faster unzipping.

PSA mapping is maintained throughout the CDEF compression process and is accessed by the CD-ROM feed receiving hardware and software such that the feed appears to be coming from a conventional CD-ROM. That is, the typical CD-ROM software will request a specific PSA (2 KB of data) and send the data to the PS within the time and bandwidth that the CD-ROM requires.

The present invention may allow CD-ROM security to be maintained with the CDEF system, (with existing unencrypt and encrypt programs that PS uses implemented in CDEF) Further, additional security features with CDEF may be enabled. For example, the CDEF system may enable more levels of security than the original CD-ROM security.

The CDEF approach of the present invention may allow the security to be sustained. Further, the SD card security of watermarking per Secure Digital Music Initiative (SDMI), authentication protocol and a security command set can be supported. The protocols of the Secure Digital Music Initiative is hereby incorporated by reference in its entirety. Also, flash silicon specific security such as factory lock (by AMD) and customer lock may be implemented. For example, the factory lock may lock the flash card to be used only for CDEF playstation implementations, while the customer lock may be constrained for use with a specific game on a specific playstation via the serial number. The customer lock may be activated when a particular game is downloaded to the flash card. Various combinations are possible and contemplate within the scope of the present invention. Furthermore, the present invention may allow games to be downloaded from a cell phone through the worldwide web or other appropriate connection, enabling pay-per-play as well.

The CDEF unzip system may implement windowing into the unzip inflate that may discard all the decompressed files except the 32 KB block sector that has the specified PSA data that the PS access requested. The CDEF unzip system may cache up to 192 sectors of data for PS access. The present invention may implement a balanced cache size that utilizes memory to provide infrequent access to the flash card memory source, saving power. The caching size can be dynamic as well, using up to the available memory as each sector is about 2 KB is size.

The partitioning of the system (PS, computer or portable device) may be variable and dynamic, based on particular system needs. If there is adequate memory remaining in the CDEF card, all CDEF memory requirements can be met on the card. The ATA interface bus (of the flash card) is generally 8-bits and provides a variable data rate to support the PS feed. Alternatively, the PS parallel port can be used for a CDEF card slot or a direct feed from the PC zip processes to internal flash or DRAM. Furthermore, the CDEF card can use SDRAM for more caching, if needed.

Alternatively, flash cards do not need to be used if the mobile device has adequate web access and/or local memory. For example, the CDEF process may be utilized to download an encrypted zipped CD-ROM data file in the CDEF format to the local memory. The CDEF unzip system may process the download-data and provide the feed to the PS. Additionally, SDRAM memory can be alternatively implemented at a reduced cost.

At a 4-1 compression, if 160 MB of data is to be downloaded at a 144 Mb/sec download rate to a wireless phone, the download may require 2.5 hours. At a 6-1 compression, the 160 MB download may require a single hour. Moreover, communication technology is being planned to effectively improve download data rates to cellular phones.

Existing PS can be upgraded to support the CDEF card feed. That is, the PC can receive a downloaded game from a particular web site, the game may then be CDEF zipped to a flash card, and thus used by the flash card interface on a software upgraded PS gaming console. The customer may purchase a download of the game from the web. The PS software upgrade is simply to provide the equivalent of the CD-ROM feed to the ATA bus.

In-coming calls can be handled during PS play. The headset option to have a microphone used with hardware and software to enable the call on a channel speaker on the headset is enabled. PS cell phones application where the PS is used in traditional TV setting as well. PS cell phone application with power conservation features of power down mode, cellular receive calls only, cellular use without display, cellular use with display, PS only, PS-receive calls, PS-cellular use, and display backlit on or off on any of the modes. Additionally, cellular text can be overlay by the OSD. For example, text may be typically overlaid at 4 lines of 12 characters.

While the invention has been particularly shown and described with reference to the preferred embodiments thereof, it will be understood by those skilled in the art that various changes in form and details may be made without departing from the spirit and scope of the invention.

What is claimed is:

1. A method for storing data in a solid state device, comprising the steps of:
   (A) retrieving data from a source device;
   (B) storing said data in a compressed format to said solid state device; and
   (C) accessing and uncompressing portions of said data from said solid state device, wherein said portions represent data to be executed in response to a physical sector address.

2. The method according to claim 1, wherein step (A) is configured to retrieve data in response to said physical sector address.

3. The method according to claim 1, wherein said solid state device comprises a flash memory.

4. The method according to claim 1, wherein said solid state device comprises a DRAM local memory.

5. The method according to claim 1, wherein step (B) is further configured to provide lossless compression of CD-ROM data.

6. The method according to claim 1, wherein step (B) is further configured to allow a physical sector address (PSA) mapping to be maintained throughout a compression process.

7. The method according to claim 1, wherein step (C) is configured to access the data through hardware and software.

8. The method according to claim 1, wherein step (C) is further configured to allow windowing into a compressed file.

9. The method according to claim 1, wherein step (C) is further configured to provide cache sectors for fast access.

10. The method according to claim 9, wherein step (C) is further configured to have a balanced cache size.

11. The method according to claim 1, wherein steps (B) and (C) are further configured to allow variable and dynamic partitioning of system resources.

12. The method according to claim 1, wherein steps (B) and (C) are further configured to have flexible partitioning based on system needs.

13. The method according to claim 1, wherein step (B) is further configured to optimize said compressed format for step (C).

14. The method according to claim 1, further comprising the step of:

upgrading a device to support steps (B) and (C).

15. The method according to claim 1, further comprising the step of:

downloading and storing data to said solid-state device.

16. The method according to claim 1, wherein:

step (A) is configured to retrieve data from a CD-ROM;

step (B) is configured to provide lossless compression of CD-ROM data such that a flash card can store the CD-ROM data; and step (C) is configured to access and uncompress said CD-ROM data at CD-ROM data rates, wherein step (C) requires hardware/software acceleration to meet the CD-ROM data rate.

17. The method according to claim 1, wherein step (B) is configured to maintain a physical sector address (PSA) mapping throughout a compression process and step (C) is configured to implement said PSA mapping such that the data is feed through CD-ROM feed receiving hardware and software and appears to be from a CD-ROM drive.

18. The method according to claim 1, wherein step (B) is further configured to (i) maintain CD-ROM security or (ii) provide additional levels of security beyond traditional CD-ROM security.

19. The method according to claim 1, wherein step (C) is further configured to allow windowing into an inflate process that discards decompressed files except a particular portion of data that is requested.

20. A method for storing data having one or more physical sector addresses (PSAs) in a solid state device, comprising the steps of:

(A) storing and compressing said data in an optimized format to said solid state device while maintaining said one or more PSAs; and (B) accessing and uncompressing one or more blocks of said data from said solid state device, wherein a particular portion of said one or more blocks of data are accessed and uncompressed in response to said one or more PSAs.

* * * * *